United States Patent

[11] 3,609,188

| | | | |
|---|---|---|---|
| [72] | Inventors | Robert Carlyle Esse<br>Pearl River, N.Y.;<br>George Madison Sieger, Montvale, N.J. | |
| [21] | Appl. No. | 407,540 | |
| [22] | Filed | Oct. 29, 1964 | |
| [45] | Patented | Sept. 28, 1971 | |
| [73] | Assignee | American Cyanamid Company<br>Stamford, Conn.<br>Continuation-in-part of application Ser. No. 380,668, July 6, 1964, now abandoned, which is a continuation-in-part of application Ser. No. 305,829, Aug. 30, 1963, now abandoned, which is a continuation-in-part of application Ser. No. 233,946, Oct. 29, 1962, now abandoned. | |

[52] U.S. Cl. .................................................. 260/559 AT,
424/200, 424/227
[51] Int. Cl. .................................................... C07c 103/19
[50] Field of Search ........................................ 260/559 AT

[56]  References Cited
UNITED STATES PATENTS
3,364,260  1/1968  Neidleman ................... 260/559 AT

*Primary Examiner*—Nicholas S. Rizzo
*Assistant Examiner*—Anne Marie T. Tighe
*Attorney*—Edward A. Conroy, Jr.

[54] 4-DEDIMETHYLAMINO-4-SUBSTITUTED-AMINO-6-DEMETHYLTETRACYCLINES
22 Claims, No Drawings ABSTRACT: This disclosure describes compounds of the class of 4-dedimethylamino-4-substituted-amino-6-demethyltetracyclines useful as antibacterial agents.

4-DEDIMETHYLAMINO-4-SUBSTITUTED-AMINO-6-DEMETHYLTETRACYCLINES

This application is a continuation-in-part of our copending application Ser. No. 380,668, filed July 6, 1964 now abandoned; which in turn is a continuation-in-part of our copending application Ser. No. 305,829, filed Aug. 30, 1963, now abandoned; which in turn is a continuation-in-part of our application Ser. No. 233,946, filed Oct. 29, 1962, now abandoned.

This invention relates to new organic compounds and, more particularly, is concerned with novel 4-dedimethylamino-4-substituted-amino-6-demethyltetracyclines and to methods of preparing these novel compounds. The novel 4-dedimethylamino-4-substituted-amino-6-demethyltetracyclines of the present invention may be represented by the following general formula:

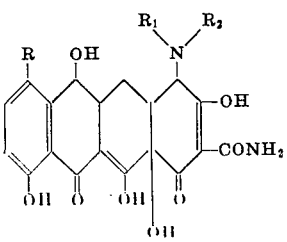

wherein R is hydrogen or halogen, $R_1$ is hydrogen or lower alkyl and $R_2$ is hydrogen, lower alkyl or hydroxy lower alkyl, with the proviso that $R_1$ and $R_2$ cannot both be methyl. Lower alkyl groups contemplated by the present invention are those having up to about six carbon atoms. Suitably hydroxy lower alkyl groups may be, for example, β-hydroxyethyl, γ-hydroxypropyl, β-hydroxypropyl, and the like. Halogen is exemplified by chlorine, bromine and iodine. A preferred embodiment of the present invention may be represented by the above general formula wherein R is hydrogen or halogen and $R_1$ and $R_2$ are each lower alkyl with the proviso that $R_1$ and $R_2$ cannot both be methyl. Another preferred embodiment of the present invention may be represented by the above general formula wherein R is hydrogen or halogen and $R_1$ and $R_2$ are both hydrogen. The novel compounds of the present invention are well defined crystalline materials having characteristic ultraviolet absorption spectra. They may be conveniently purified either by crystallization from a suitable solvent or by partition-column chromatography.

The novel compounds of the present invention may be readily prepared from the appropriately substituted 4-hydroxy-tetracycloxides of the following general formula:

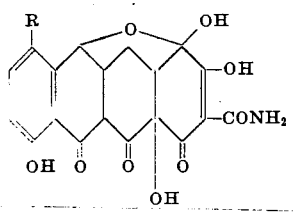

wherein R is hydrogen or halogen. For example, an appropriately substituted 4-hydroxytetracycloxide may be reductively aminated with a primary lower alkyl amine or with a lower alkanolamine whereby the corresponding 4-dedimethylamino-4-mono(lower aklyl)amino-6-demethyltetracycline or 4-dedimethylamino-4-mono(hydroxy lower alkyl)amino-6-demethyltetracycline is obtained. This reductive amination process may be accomplished in a solvent for the starting compound in the presence of the requisite primary amine and a metal catalyst and hydrogen gas at pressures from atmospheric to superatmospheric. Ordinarily, the reductive amination is conveniently carried out at hydrogen pressures of from about 1 to about 4 atmospheres. Temperature does not appear to be critical in the reductive amination. Temperatures of from 0° C. to 50° C., and usually room temperature, are preferred since they generally give best results. The metal catalyst is preferably of the noble metal type, advantageously employed on a carrier such as finely divided alumina, activated charcoal, etc. in which form they are commonly available. Generally the reductive amination may be carried out in solvents such as lower alkanols, dimethylformamide, methyl-cellosolve, tetrahydrofuran, etc.

The 4-dedimethylamino-4-mono(lower alkyl)amino-6-demethyltetracycline or 4-dedimethylamino-4-mono(hydroxy lower alkyl)amino-6-demethyltetracycline so obtained may then be treated with a lower alkanol whereby there are obtained the novel compounds according to the following formula:

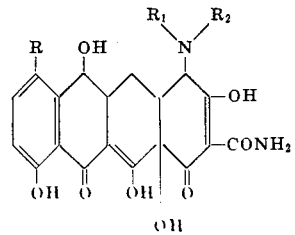

wherein $R_1$ and $R_2$ are both lower alkyl or wherein $R_1$ is lower alkyl and $R_2$ is hydroxy lower alkyl. This reductive alkylation process may be accomplished by either chemical or catalytic reduction using procedures well known to those in the art. Catalytic reduction, which is especially suited for the reductive alkylation of the starting compounds mentioned above, may be accomplished in a solvent for the starting compound in the presence of a carbonyl compound and a metal catalyst and hydrogen gas at pressures from atmospheric to superatmospheric. Ordinarily, the reductive alkylation is conveniently carried out at hydrogen pressures of from about 1 to about 4 atmosphere. Although somewhat elevated temperatures facilitate the catalytic hydrogenation, temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc., in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, product, or hydrogen under the conditions of the reaction. A variety of solvents may be used for this purpose and minimum laboratory experimentation will permit the selection of a suitable solvent for any specific starting compound. Generally, the catalytic reductive alkylation may be carried out in solvents such as water, lower alkanols, e.g., methanol, ethanol; lower alkoxy lower alkanols, e.g., 2-methoxyethanol, 2-ethoxyethanol; tetrahydrofuran, dioxane, dimethylformamide, etc.

A variety of chemical reducing agents may be used in the reductive alkylation process. These include reduction with sodium borohydride or with active metals in mineral acids, e.g., zinc, tin, or iron in hydrochloric acid; reduction with metal couples such as the copper-zinc couple, the tin-mercury couple, aluminum amalgam, or magnesium amalgam; and reduction with formic acid. Of these, reduction with zinc and hydrochloric acid and reduction with formic acid are preferred. When aqueous systems are used in the aforementioned chemical reductive alkylations, it is at times desirable to utilize a water-miscible organic solvent, particularly when the starting compound is of limited solubility in the reaction mixture. The water-miscible solvent does not alter the course of the reduction but merely provides for more efficient reduction, e.g., a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

The 4-dedimethylamino-4-amino-6-demethyltetracycles of the present invention may also be readily prepared from the appropriately substituted 4-hydroxytetracycloxides of the general formula as set forth on page 2 by way of the intermediate 4-oxime or 4-hydrazone. For example, an appropriately substituted 4-hydroxytetracycloxide may be treated with hydroxylamine or hydrazine under alkaline conditions in a solvent such as water or lower alkanols or mixtures thereof. The hydroxylamine and hydrazine are preferably employed in the form of their hydrochloride salts with sufficient alkali to neutralize the hydrochloric acid and provide the requisite alkaline conditions. The intermediate 4-dedimethylamino-4-oxo-6-demethyltetracycline-4-oximes so obtained may be isolated as the alkali metal salts thereof, such as the sodium salt or the potassium salt, or as the free oxime. The 4-dedimethylamino-4-oxo-6-demethyltetracycline-4-hydrazones form acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, and related acids.

The intermediate 4-dedimethylamino-4-oxo-6-demethyltetracycline-4-oximes and 4-hydrazones may then be catalytically reduced to the corresponding 4-dedimethylamino-4-amino-6-demethyltetracycline. The catalytic reduction may be accomplished in a solvent for the starting compound in the presence of a metal catalyst and hydrogen gas at pressures from atmospheric to superatmospheric, Ordinarily, the catalytic reduction is conveniently carried out at hydrogen pressure of from about 1 to about 4 atmospheres. Although somewhat elevated temperatures facilitate the catalytic hydrogenation, temperatures of from 0° C. to 60° C., and usually room temperature, are preferred since they generally give best results. The metal catalyst may be of the base metal type, such as nickel or copper chromite, or it may be of the noble metal type, such as finely divided palladium or platinum. The noble metal catalysts are advantageously employed on a carrier such as finely divided alumina, activated charcoal, diatomaceous earth, etc. in which form they are commonly available. The hydrogenation is carried out until the desired amount of hydrogen gas is absorbed, at which point the hydrogenation is stopped. The solvents selected for the catalytic reduction should be reaction-inert, that is, they should not be capable of reacting with the starting materials, product, or hydrogen under the conditions of the reaction. Generally, the catalytic reduction may be carried out in a solvent such as water, lower alkanols, tetrahydrofuran, dioxane, dimethylformamide, methyl cellosolve, etc.

The intermediate 4-dedimethylamino-4-oxo-6-demethyltetracycline-4-oximes and 4-hydrazones may also be reduced to the corresponding 4-amino derivatives with a variety of chemical reducing agents. These include reduction with sodium borohydride or with active metals in strong acids, e.g., zinc and glacial acetic acid, tin or iron and hydrochloric acid; reduction with metal couples such as the copper-zinc couple or sodium amalgam; and reduction with sodium dithionate. Of these, reduction with zinc and glacial acetic acid and reduction with sodium dithionate are preferred. When aqueous systems are used in the aforementioned chemical reductions, it is at times desirable to utilize water-miscible organic solvent, particularly when the starting compound is of limited solubility in the reaction mixture. The water-miscible solvent does not alter the course of the reduction but merely provides for more efficient reduction, e.g., a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

The 4-dedimethylamino-4-amino-6-demethyltetracyclines of the present invention may also be readily prepared from the appropriately substituted 4-hydroxytetracycloxides of the general formula as set forth on page 2 by reductive amination. For example, an appropriately substituted 4-hydroxytetracycloxide may be treated with an ammonium salt under strongly alkaline conditions in a solvent such as ethylene glycol and in the presence of a metal catalyst and hydrogen gas at pressures from atmospheric to superatmospheric.

The novel compounds of the present invention may be isolated by various procedures well known to the art. For example, insolubles such as salts or spent catalysts may be removed by filtration, followed by removal of the solvent under reduced pressure. The residue may then be treated with aqueous acid followed by the removal of insolubles by filtration. The resulting acid solution can be extracted by n appropriate solvent such as butanol. Concentration of the butanol extract gives the desired product which may then be purified either by crystallization or by partition-column chromatography.

The 4-hydroxytetracycloxides of the following general formula:

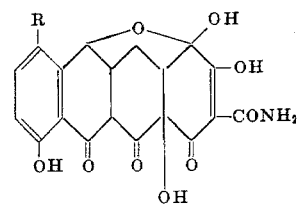

wherein R is hydrogen or halogen, the starting materials for the novel compounds of the present invention, may be readily prepared in good yield by treating 6-demethyltetracycline or a 7-halo-6-demethyltetracycline with sodium chlorate in the presence of hydrochloric acid or with an N-halosuccinimide. The reaction is conveniently carried out in a suitable solvent such as, for example, glacial acetic acid, methanol, dimethylformamide, and the like, at temperatures ranging from −10° C. to 35° C. over a period of time of from as little as a few minutes to an hour or more. After the reaction is complete, the product may be obtained by standard procedures. For example, it is most convenient to merely dilute the reaction mixture with a nonsolvent, e.g., water, which results in precipitation of the product. The crude product may then be purified by recrystallization from a methylcellosolve–0.1N hydrochloric acid mixture.

The novel compounds of the present invention are biologically active and possess broad spectrum antibacterial activity. For example, the antibacterial spectrum of 4-dedimethylamino-4-methylethlamino-6-demethyltetracycline and 4-dedimethylamino-4-methyl(β-hydroxyethyl)amino-6-demethyltetracycline was determined in a standard manner by the agar dilution streak technique. The antibacterial spectrum of a compound represents the amount required to inhibit the growth of various typical bacteria and is commonly used in testing new antibiotics, The minimal inhibitory concentrations expressed in gammas per milliliter of these two compounds against various test organisms is shown in table I below. For comparison purposes, the antibacterial spectrum of 6-demethyltetracycline hydrochloride against the same organisms is also included.

TABLE I (1) 4-dedimethylamino-4-methylethylamino-6-demethyltetracycline (2) 4-dedimethylamino-4methyl(β-hydroxyethyl)amino-6-demethyltetracycline
(3) 6-demethyltetracycline hydrochloride

| Organism | (1) | (2) | (3) |
|---|---|---|---|
| Mycobacterium ranae | 1 | 15 | 2 |
| Mycobacterium smegmatis ATCC 607 | 2 | 15 | 4 |
| Staphylococcus aureus 209 P | 4 | 15 | 4 |
| Bacillus subtilis ATCC 6933 | 1 | 15 | 1 |
| Streptococcus pyogenes | 2 |  | 2 |
| Streptococcus γ No. 11 | 125 | >250 | 125 |
| Staphylococcus albus No. 69 | 125 | >250 | >250 |
| Streptococcus β No. 80 | 125 | >250 | 250 |
| Bacillus cereus No. 5 | 1 | 2 | 1 |
| Pseudomonas aeruginosa | 62 | 250 | 31 |
| Escherichia coli ATCC 9637 | 8 | 62 | 15 |
| Salmonella gallinarum | 8 | 62 | 15 |
| Streptococcus faecalis ATCC 8043 | 4 | 15 | 4 |
| Klebsiella pneumonia ATCC 10031 | 4 | 4 | 4 |
| Proteus vulgaris ATCC 9484 | 8 | 15 | 15 |

The novel compounds of the present invention also possess unusual activity against gram negative micro-organisms such as *Escherichia coli* and *Salmonella typhosa*. It has been determined that when administered in a single oral tubing dose of 16 mg./kg. of body weight against *Escherichia coli* infections in mice; 4-dedimethylamino-4-methylpropylamino-6-demethyltetracycline is twice as effective as tetracycline, 4-dedimethylamino-4-diethylamino-6-demethyltetracycline is three times as effective as tetracycline, and 4-dedimethylamino-4-methylethylamino-6-demethyltetracycline is twice as effective as 6-demethyltetracycline.

The present invention also embraces the useful nontoxic pharmaceutically acceptable acid-addition salts of these novel compounds. Typical acid-addition salts are the hydrochlorides, hydrobromides, sulfates, citrates, tartrates, succinates, and the like. Although the novel compounds of the present invention may be used as such, they are preferably administered in the form of their nontoxic acid-addition salts which may be readily prepared by treatment with one equivalent of an acid such as hydrochloric, sulfuric, phosphoric, citric, etc., in a suitable solvent.

The invention will be described in greater detail in conjunction with the following specific examples.

EXAMPLE 1

4-Hydroxytetracycloxide

In a solution of 800 ml. of methanol and 170 ml. of concentrated hydrochloric acid was dissolved 86 g. of 6-demethyltetracycline. Then a solution of 8.6 g. of sodium chlorate in 40 ml. of water was added over a 10 minute period. At the beginning of the addition, the temperature of the reaction mixture was 19.5° C., whereas at the end of the addition the temperature had risen to 25.5° C. Five minutes after the addition was complete the temperature of the reaction mixture had risen to 32° C. whereupon a heavy precipitate began forming. The reaction mixture was then stirred at room temperature for 10 minutes and then at ice bath temperature for 1 hour. The reaction mixture was then diluted with 200 ml. of water, the precipitate was removed by filtration and washed several times with water. The yield of vacuum-oven dried product was 50 g. The 4-hydroxytetracycloxide was recrystallized as follows: 1 g. was dissolved in 20 ml. of methyl cellosolve and stirred with 200 mg. of Darco for 20 minutes, the Darco was removed by filtration, and the white crystalline product was precipitated by the addition of 4 volumes of 0.1N hydrochloric acid.

EXAMPLE 2

4-Hydroxytetracycloxide

In 30 ml. of glacial acetic acid was dissolved 4.3 g. of 6-demethyltetracycline and to this solution was added 1.5 g. of N-chlorosuccinimide over a period of 5 minutes. The resulting solution was stirred at room temperature for 30 minutes and then poured into 300 ml. of water. The precipitate which formed was removed by filtration and vacuum oven dried. Recrystallization of the 4-hydroxytetracycloxide was effected in the same manner as in example 1.

EXAMPLE 3

4-Hydroxytetracycloxide

In 280 ml. of dimethylformamide was dissolved 10 g. of 6-demethyltetracycline and the resulting solution was exposed to air at room temperature for 10 days. Isolation was by evaporation of the solvent under reduced pressure followed by slurrying the dried residue in 250 ml. of 0.1N hydrochloric acid, and collecting the insoluble material by filtration. This crude product, 4-hydroxytetracycloxide, was purified by recrystallization as in example 1.

EXAMPLE 4

4-Dedimethylamino-4-ethylamino-6-demethyltetracycline

4-Hydroxytetracycloxide (3.0 g.) was dissolved in tetrahydrofuran (150 ml.) and 70 percent aqueous ethylamine (6.0 ml.) was added. The solution was combined with 750 mg. of 10 percent palladium on charcoal catalyst and immediately placed in a 500 ml. bottle and hydrogenated at 50 lbs. The reductive amination was essentially complete within 20 minutes. The catalyst was removed by filtration and the filtrate taken to dryness under reduced pressure. The crude product was collected with ether and dried. It was then suspended in methanol (40 ml.) and conc. HCl was added to give a solution with an apparent pH of one. The acidified solution was stirred for 30 minutes, during which time a crystalline byproduct formed. The byproduct was removed by filtration. Triethylamine was added to the filtrate to give a solution having an apparent pH of 7.0. Two glass beads were added and the solution was shaken for 2 hours. The crystalline 4-dedimethylamino-4-ethylamino-6-demethyltetracycline which formed was filtered off and washed successively with chloroform and ether. Yield: 1.15 g.

EXAMPLE 5

4-Dedimethylamino-4-methylethylamino-6-demethyltetracycline

4-Dedimethylamino-4-ethylamino-6-demethyltetracycline (2.0 g.) was combined, in methanol (100 ml.), with 37 percent aqueous formaldehyde (3.2 ml.) and the apparent pH adjusted to between 3.5 and 4.5 with conc. HCl. About 0.4 ml. of conc. HCl was required. The solution was combined with 600 mg. of 10 percent palladium on carbon catalyst and the mixture was hydrogenated at 50 lbs. pressure for 24 hours. The catalyst was removed by filtration and the filtrate taken to dryness under reduced pressure. The product was collected with the aid of ether and dried. Paper chromatographic analysis revealed the crude product consisted largely of 4-dedimethylamino-4-eip-methylethylamino-6-demethyltetracycline along with a lesser amount of the "natural" 4-epimer.

The procedure for the conversion of this material to the "-natural" 4-epimer was as follows: The 4-methylethylamino derivative (1.0 g.) was dissolved in propylene glycol (45 ml.). Then, $CaCl_2 \cdot 2H_2O$ (920 mg.) dissolved in water (1 ml.) was added to the propylene glycol solution and the apparent pH of the mixture raised to 8.9 by the addition of ethanolamine. The solution was stored under a nitrogen atmosphere at 56° C. At the end of one week, paper chromatographic analysis showed the conversion to the "natural" 4-epimer was essentially complete. The solution was added dropwise to water (220 ml.) and the product, which precipitated as a calcium salt, was collected and dried. The calcium salt (500 mg.) was suspended in water (10 ml.) and then dissolved by lowering the pH to below 2.0 with dil. HCl Raising the pH back to 2.0 with dilute sodium hydroxide resulted in the precipitation of crystalline 4-dedimethylamino-4-methylethylamino-6-demethyltetracycline having the "natural" configuration at C–4. The product was collected by filtration, washed with water and dried. The material assayed at 73 percent of tetracycline HCl in the standard turbidimetric assay (*Staph. aureus*).

EXAMPLE 6

7-Chloro-4-hydroxytetracycloxide

6-Demethyl-7-chlorotetracycline (46.5 g.) was dissolved in glacial acetic acid (300 ml.). Concentrated HCl (85 ml.) was added to this solution and the resulting solution was then cooled to just above freezing with an ice bath. To the cooled, stirred solution there was added dropwise. over a 10 minute period, a solution of sodium chlorate (4.3 g.) in 20 ml. water. At the end of the addition period, the ice bath was removed and the reaction mixture was stirred an additional 10 minutes and then poured into 3 liters of water. The precipitated reaction mixture was stirred at room temperature for two hours, then placed in a chill room (4°C.) overnight. The product was collected and dried. Yield: 33.3 g. An analytically pure sample was obtained as follows: The crude material (44 g.) was dissolved in 250 ml. of dimethylformamide and treated with Darco G–60 (10 g.). The solution was filtered and diluted with one liter of water giving a gummy precipitate. The gum was collected and retreated with Darco G–60 in dimethylforamide. Slow addition of two volumes of water gave a crystalline product. Repeating this procedure on the isolated crystals gave a sample (23 g.) which analyzed correctly for the product with one mole of crystallization of dimethylformamide.

EXAMPLE 7

4-Dedimethylamino-4-methylamino-6-demethyl-7-chlorotetracycline

Methylamine hydrochloride (844 mg.) was dissolved in methylcellosolve (20 ml.) and 10N NaOH was added to an apparent pH of 10.6. The salt which formed was removed by filtration. To the amine-containing solution was added 7-chloro-4-hydroxytetracycloxide followed immediately by addition, over a 2 minute period, of sodium borohydride (93 mg.) The solution was stirred 30 minutes, then taken to dryness under reduced pressure. The crude solid was taken up in water (100 ml.) and the pH adjusted to 0.8 with HCl. The insoluble materials were removed by filtration and the filtrate was extracted with butanol. Removal of the butanol under reduced pressure gave crude 4-dedimethylamino-4 -methylamino-6-demethyl-7-chlorotetracycline. Purification of this material could be accomplished by crystallization procedures or by chromatographic means.

EXAMPLE 8

4-Dedimethylamino-4-methylethylamino-6-demethyltetracycline

4-Dedimethylamino-4-methylamino-6-demethyltetracycline (1.0 g.) was suspended in methylcellosolve (20 ml.). Then, 2N sulfuric acid was added to an apparent pH reading of 4.0. Complete solution resulted. Acetaldehyde (3 ml.) and 10 percent palladium on charcoal (300 mg.) were added to the solution and the mixture was hydrogenated at 50 lbs. pressure for 17 hours. The catalyst was removed by filtration and the filtrate concentrated to dryness under reduced pressure. The product was collected with the aid of ether. The product consisted primarily of the two possible 4-epimers of 4-dedimethylamino-4-methylethylamino-6-demethyltetracycline. Isolation of pure components could be accomplished by partition chromatography.

EXAMPLE 9

4-Dedimethylamino-4-n-propylamino-6-demethyltetracycline

4-Hydroxytetracycloxide (3.0 g.) was dissolved in tetrahydrofuran (150 ml.) and *n*-propylamine (4.5 ml.) was added. The solution was combined with 10 percent palladium on carbon (750 mg.) and immediately placed in a 500 ml. bottle and hydrogenated at 50 lbs. pressure. The reductive amination was essentially complete within 20 minutes. The catalyst was removed by filtration and the filtrate taken to dryness under reduced pressure. The crude product was collected with the aid of ether and dried. It was then suspended in methanol (40 ml.) and conc. HCl was added to give a solution with an apparent pH of one. The acidified solution was stirred for thirty minutes and the crystalline byproduct which formed was removed by filtration. Triethylamine was added to the filtrate to give a solution with an apparent pH of 7.0. Two glass beads were added and the solution was shaken at −9° C. for 18 hours. The crystalline 4-dedimethylamino-4-*n-propylamino*-6-demethyltetracycline which formed was collected by filtration and washed successively with chloroform and ether.

EXAMPLE 10

4-Dedimethylamino-4-methyl-*n*-propylamino-6-demethyltetracycline

4-Dedimethylamino-4-*n*-propylamino-6-demethyltetracycline (1.0 g.) and 37 percent formaldehyde (1.6 ml.) were combined with methanol (50 ml.) with the pH of the solution being adjusted to 3.5–4.5 with hydrochloric acid. To this solution was added 10 percent palladium on carbon (300 mg.) and the mixture was hydrogenated at 50 lbs pressure for 24 hours. The catalyst was removed by filtration and the filtrate taken to dryness under reduced pressure. The residue was collected with the aid of ether and dried. The crude product consisted largely of a mixture of the two possible 4-epimers of 4-dedimethylamino-4-methyl-*n*-propylamino-6-demethyltetracycline. Isolation of the pure "natural" 4-epimer could be accomplished by partition-column chromatography.

EXAMPLE 11

4-Dedimethylamino-4-*n*-butylamino-6-demethyltetracycline

4-Hydroxytetracycloxide (3.0 g.) was dissolved in tetrahydrofuran (150 ml.) and the solution combined with 10 percent palladium on carbon (750 mg.) in a 500 ml. bottle. *n*-Butylamine (5.7 ml.) was added and hydrogenation at 50 lbs. pressure was begun as quickly as possible. After twenty minutes the reaction was stopped and the catalyst was removed by filtration. The filtrate was concentrated to dryness under reduced pressure. Six such reactions were run. The combined crude products were dissolved in methanol (200 ml.) and the pH was adjusted to 1.0 with conc. HCl The solution was stirred in the cold for 30 minutes and the yellow byproduct which crystallized was removed by filtration. The filtrate was adjusted to pH 7.1 with triethylamine and then shaken with two glass beads at −8° C. for 18 hours. The crystallized product was collected and washed successively with cold methanol, chloroform and ether. Yield: 3.9 g.

EXAMPLE 12

4-dedimethylamino-4-(2hydroxyethyl)-amino-6-demethyltetracycline

4-Hydroxytetracycloxide (4.0 g.) was dissolved in methanol (150 ml.) and, without delay, 2-aminoethanol (7.0 ml.) was added to the vigorously stirred solution. The resulting clear solution was quickly transferred to a nitrogen-filled 500 ml. bottle which contained 1.2 g. of 10 percent palladium on carbon. The bottle was placed on a Paar hydrogenation apparatus. The reduction was run for 20 minutes at 50 lbs pressure. The catalyst was removed by filtration and the filtrate was concentrated, under reduced pressure, to a viscous oil. Methanol (12ml.) was added to this oil and the resulting solution was added dropwise to acetone (270 ml.) with vigorous stirring. The resulting precipitate was collected by filtration, washed with ether and dried. Yield: 4.1 g.

The crude material was dissolved in a mixture of water (60 ml.) and methanol (20 ml.). The solution was made strongly acid by the rapid addition of conc. HCl (3ml.). The mixture was stirred for 1 hour at ice-bath temperature and then filtered. To the filtrate was added, all at once, triethylamine (ca. 4 ml.) to give a clear, alkaline solution. The pH was then adjusted, by the slow addition of 6N HCl to about 6.5 at which point crystal formation occurred. The mixture was stirred at ice-bath temperature for 30 minutes. The product was collected by filtration, washed with 25 percent methanol and dried in a vacuum-oven. Yield: 910 mg.

EXAMPLE 13

4-Dedimethylamino-4-(3-hydroxypropyl)amino-6-demethyltetracycline

4-Hydroxytetracycloxide (4.0 g.) was dissolved in methanol (150 ml.) and, without delay, 3-aminopropanol (8.6 ml.) was added to the vigorously stirred solution. The resulting clear solution was quickly transferred to a nitrogen-filled bottle which contained 1.2 g. of 10 percent palladium on carbon. The bottle was placed on a low pressure Paar hydrogenation apparatus. The reduction was run for twenty minutes at 50 lbs. pressure. The catalyst was removed by filtration and the filtrate was concentrated, under reduced pressure, to a viscous oil. Yield: (15 ml.) was added to this oil and the resulting solution was added dropwise to acetone (300 ml.) with vigorous stirring. The resulting precipitate was collected by filtration, washed with ether and dried. Yield: 4.1 g.

The crude material was dissolved in methanol (35 ml.) and conc. HCl was added until an apparent pH value of 1.0 was reached. The mixture was stirred at ice-bath temperature for 0.5 hour and the yellow byproduct which formed was removed by filtration. The pH of the filtrate was raised to an apparent value of 5.2 by the addition of triethylamine. The mixture was stirred at ice-bath temperature for 0.5 hour and the crystals which formed were collected by filtration and washed successively with chloroform and ether. Yield: 1.0 g.

EXAMPLE 14

4-Dedimethylamino-4-(2-hydroxyethyl)methylamino-6-demethyltetracycline a. Methylation 4-Dedimethylamino-4-(2-hydroxyethyl)amino-6-demethyltetracycline (3.0 g.) was dissolved in methanol (150 ml.) containing conc. HCl (3 drops) and 37 percent aqueous formaldehyde (6 ml.). The solution was combined with 1.2 g. of 10 percent palladium on carbon in a 500 ml. bottle. The mixture was placed on a Paar hydrogenation apparatus and hydrogenated at 50 lbs. pressure and 55° C. for 17 hours. The catalyst was removed by filtration and the filtrate was concentrated to dryness under reduced pressure. The residue was collected with the aid of ether and dried.

b. Conversion to all "natural" configuration at C.4 Conversion was accomplished in essentially the same manner as is described for 4-dedimethylamino-4-methylethylamino-6-demethyltetracycline.

c. Purification The crude, upgraded material (1.0 g.) was dissolved in methanol (5 ml.). The solution was diluted with water (5 ml.) with the pH being maintained near 1.0 by the addition of HCl. The solution was treated with Darco (200 mg.), then filtered. The pH of the filtrate was raised to 3.0 with 30 percent triethylamine in methanol. The solution was diluted with water (5 ml.) and the pH raised again to 3.5 where crystallization began. The pH was maintained at 3.5 during the crystallization process. The mixture was gently stirred at ice-bath temperature for 1 hour. The crystals were collected, washed with a small amount of cold, dilute methanol and dried. Yield: 400 mg.

EXAMPLE 15

4Dedimethylamino-4-diethylamino-6-demethyltetracycline a. Ethylation 4-Dedimethylamino-4-ethylamino-6-demethyltetracycline (2.0 g.) was dissolved in a mixture of dioxane (200 ml.) and acetaldehyde (10 ml.). The solution was combined with the catalyst (10 percent Pd/C, 800 mg.) in a 500 ml. bottle and hydrogenated at 50 lbs. pressure at 50–60° C. for 17 hours. The catalyst was removed by filtration and the filtrate was concentrated to dryness under reduced pressure. The residue was suspended in a mixture of Skellysolve B (100 ml.) and ether (30 ml.), collected by filtration and dried.

b. Conversion to all "natural " configuration at C.4. Conversion was accomplished in essentially the same manner as described for 4-dedimethylamino-4-methylethylamino-6-demethyltetracycline.

c. Purification Crude, upgraded material (3.2 g.) was dissolved in methanol (15 ml.). The solution was diluted with water (15 ml.) with the pH being maintained at 1.0 by the addition of HCl. The solution was treated with Darco (500 mg. and filtered. Triethylamine was added slowly to the filtrate to raise the pH to 3.5. Further dilution with water (15 ml.) brought about crystallization. The pH was maintained at 3.5 during the crystallization process. The mixture was stirred at ice-bath temperature for 2 hours. The product was collected by filtration, washed with a small amount of cold, dilute methanol and dried. Yield: 1.64 g.

EXAMPLE 16

4-Dedimethylamino-4-oxo-6-demethyltetracycline-4-oxime

In a solution of 17.5 g. of hydroxylamine hydrochloride in 400 ml. of water was suspended 10.0 g. of 4-hydroxytetracycloxide. To this suspension was added sufficient 10N sodium hydroxide to raise the pH to ca. 10.7 and the resulting clear, dark solution was stirred for 10 minutes. The pH was then lowered to 8.5 with conc. hydrochloric acid whereupon the product began to crystallize. During crystallization the pH was maintained between 8.5–9.0. The product was collected by filtration whereby there was obtained 20.2 g. of the oxime in the form of its sodium salt. The sodium salt was converted to the free oxime by dissolving in 600 ml. of methanol containing 10 ml. of conc. hydrochloric acid. The solution was dried with Darco, filtered, and the clear, yellow filtrate was diluted with 1,200 ml. of water. The free oxime thereupon crystallized from the solution, was collected by filtration, washed with water and dried. There was obtained 15 g. of the free oxime.

EXAMPLE 17

Catalytic Reduction of the 4-Oxime
4-Dedimethylamino-4-oxo-6-demethyltetracycline-4-oxime (4.0 g., 9.6 millimole) was dissolved in 160 ml. of methyl cellosolve. The solution was combined with 1.2 g. of 10 percent Pd/C and hydrogenated at 50 lbs./in$^2$. pressure and ca. 40° C. for 24 hours. The catalyst was removed by filtration, and the filtrate taken to dryness under reduced pressure, and the solid obtained slurried with 50 ml. of methanol. The solid was next washed with anhydrous ether, and dried in a vacuum oven. The weight of crude product was 2.88 g. This was added to 30 ml. of dimethylformamide at 70° C. with stirring. The solution was shaken with glass beads, with spontaneous crystallization of the product. After cooling to room temperature, the solid was filtered, and washed successively with 5 ml. of dimethylformamide, 20 ml. of dimethylformamide-chloroform (1:2) mixture, chloroform, and anhydrous ether. Thus was obtained 1.72 g. of crystalline 4-dedimethylamino-4-amino-6-demethyltetracycline.

EXAMPLE 18

Zinc Reduction of the 4-Oxime

To a solution of 4-dedimethylamino-4-oxo-6-demethyltetracycline-4-oxime (416 mg.) in glacial acetic acid (7.0 ml.) was added 500 mg. of zinc dust. The mixture was stirred for 10 minutes, then filtered into 100 ml. of well stirred ether. The product was collected and dried. Yield: 380 mg.

EXAMPLE 19

Sodium Dithionate Reduction of the 4-Oxime

4-Dedimethylamino-4-oxo-6-demethyltetracycline-4-oxime (50 mg.) and sodium dithionite (100 mg.) were combined in 10 ml. of 50 percent methanol. The mixture was stirred at room temperature and in less than 15 minutes the presence of 4-dedimethylamino-4-amino-6-demethyltetracycline could be demonstrated chromatographically. Workup of the product could be accomplished by extraction into butanol.

EXAMPLE 20

4-Dedimethylamino-4-oxo-6-demethyltetracycline-4-hydrazone

The procedure of example 5 is repeated, substituting an equimolecular amount of hydrazine hydrochloride for the hydroxylamine hydrochloride employed in that example. There is thus obtained the 4-dedimethylamino-4-oxo-6-demethyltetracycline-4-hydrazone.

EXAMPLE 21

Catalytic Reduction of the 4-Hydrazone

4-Dedimethylamino-4-oxo-6-demethyltetracycline-4-hydrazone (1.0 g.) was dissolved in methyl cellosolve (40 ml.). The solution was combed with 10 percent palladium on carbon (300 mg.) and hydrogenated at 50 lbs. pressure and 60° C. for 3 hours. The catalyst was removed by filtration and the filtrate was concentrated to dryness under reduced pressure. The crude 4-dedimethylamino-4-amino-6-demethyltetracycline may be purified by crystallization from warm dimethylformamide or by chromatography.

EXAMPLE 22

Reductive Amination of 4-Hydroxytetracycloxide

4-Hydroxytetracycloxide (4.0 g.) and ammonium chloride (4.0 g.) were dissolved in ethylene glycol (80 ml.). To this solution there was added 10NaOH to an apparent pH value of 10.6. The mixture was quickly combined with 10 percent palladium on carbon (1.2 g.) and hydrogenated at 50 lbs. pressure for 20 minutes. The reduction solution was filtered through Celite and the filtrate was added, with vigorous stirring, to acetone (600 ml.). The crude 4-dedimethylamino-4-amino-6-demethyltetracycline was collected and dried. Yield: 2.85 g.

What is claimed is:
1. A compound of the formula:

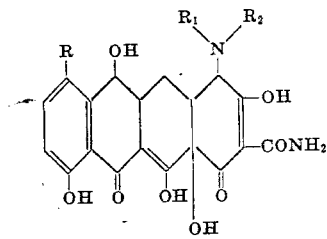

wherein R is selected from the group consisting of hydrogen and halogen, $R_1$ is selected from the group consisting of hydrogen and lower alkyl, and $R_2$ is selected from the group consisting of hydrogen, lower alkyl and hydroxy lower alkyl, with the proviso that $R_1$ and $R_2$ cannot both be methyl.

2. A compound of the formula:

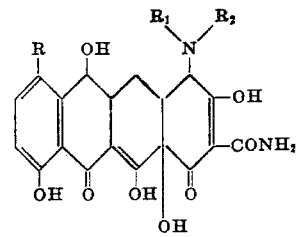

wherein R is selected from the group consisting of hydrogen and halogen, and $R_1$ and $R_2$ are lower alkyl, with the proviso that $R_1$ and $R_2$ cannot both be methyl.

3. A compound of the formula:

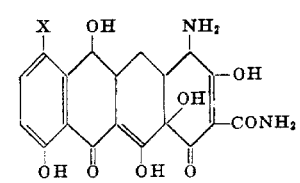

wherein X is selected from the group consisting of hydrogen and halogen.

4. 4-Dedimethylamino-4-methylamino-6-demethyltetracycline.

5. 4-Dedimethylamino-4-methylamino-6-demethyl-7-chlorotetracycline.

6. 4-Dedimethylamino-4-ethylamino-6-demethyltetracycline.

7. 4-Dedimethylamino-4-ethylamino-6-demethyl-7-bromotetracycline.

8. 4-Dedimethylamino-4-$n$-propylamino-6-demethyltetracycline.

9. 4-Dedimethylamino-4-($\beta$-hydroxyethyl)-amino-6-demethyltetracycline.

10. 4-Dedimethylamino-4-($\gamma$-hydroxypropyl)-amino-6-demethyltetracycline.

11. 4-Dedimethylamino-4-methylethylamino-6-demethyltetracycline.

12. 4-Dedimethylamino-4-methylamino-6-demethyl-7-iodotetracycline.

13. 4-Dedimethylamino-4-methyl-$n$-propylamino-6-demethyltetracycline.

14. 4-Dedimethylamino-4-diethylamino-6-demethyltetracycline.

15. 4-Dedimethylamino-4-methyl($\beta$-hydroxyethyl)-amino-6-demethyltetracycline.

16. 4-Dedimethylamino-4-amino-6-demethyltetracycline.

17. 4-Dedimethylamino-4-methylethylamino-6-demethyl-7-chlorotetracycline.

18. 4-Dedimethylamino-4-methylethylamino-6-demethyl-7-bromotetracycline.

19. The method preparing a compound of the formula:

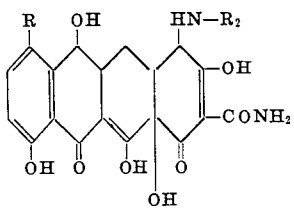

wherein R is selected from the group consisting of hydrogen and halogen, and $R_2$ is selected from the group consisting of lower alkyl and hydroxy lower alkyl, which comprises reductively aminating a compound of the formula:

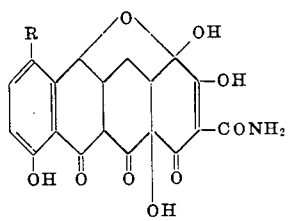

wherein R is as hereinabove defined, with a primary amine selected from the group consisting of lower alkyl amines and hydroxy lower alkyl amines, at a temperature of from about 0° C. to about 50° C.

20. The method of preparing a compound of the formula:

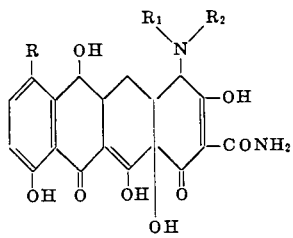

wherein R is selected from the group consisting of hydrogen and halogen, $R_1$ is lower alkyl, and $R_2$ is selected from the group consisting of lower alkyl and hydroxy lower alkyl, which comprises reductively alkylating a compound of the formula:

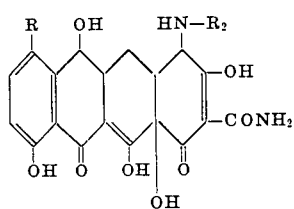

wherein R and $R_2$ are as hereinabove defined, with a lower alkanal at a temperature of from about 0° C. to about 50° C.

21. The method of preparing a compound of the formula:

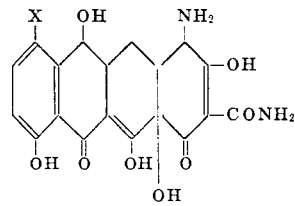

wherein X is selected from the group consisting of hydrogen and halogen; which comprises reducing a compound of the formula:

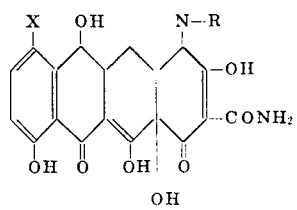

wherein R is selected from the group consisting of hydroxy and amino and X is as hereinabove defined.

22. The method of preparing a compound of the formula:

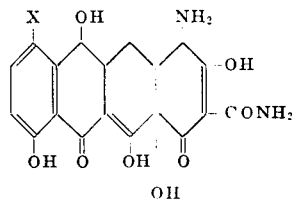

wherein X is selected from the group consisting of hydrogen and halogen; which comprises treating a compound of the formula:

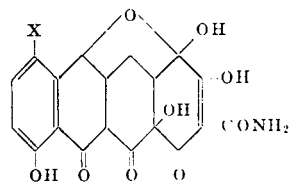

wherein X is as hereinabove defined, with ammonia in the presence of a metal catalyst and hydrogen gas.